UNITED STATES PATENT OFFICE.

ALFRED SPITZLI, OF WEST TROY, NEW YORK.

ADHESIVE WAFER.

SPECIFICATION forming part of Letters Patent No. 301,176, dated July 1, 1884.

Application filed April 28, 1884. (No specimens.)

*To all whom it may concern:*

Be it known that I, ALFRED SPITZLI, of West Troy, county of Albany, State of New York, have invented an Improvement in Adhesive Wafers, of which the following description is a specification.

My invention has for its object the production of an adhesive wafer or compound which will retain its adhesive properties for a reasonable length of time.

Some of the purposes to which my improved wafer is applied is fully described in an application executed by me on the 25th day of April, 1884, and of even date herewith, to which reference is made.

The composition of matter for the manufacture of the adhesive wafers consists of the following ingredients, combined substantially in the proportions stated, viz: glue, (softened,) sixty parts; glycerine, ten parts; Canada balsam, ten parts; oil of cloves, ten parts; sirup, ten parts; chloride of zinc or of magnesium, small proportion. The glue, or gelatine or isinglass in its stead, is saturated with water, the surplus water poured off, and the softened glue taken, as sixty parts, heated to boiling-point, when the other ingredients are stirred in and boiled until well mixed, the portion of chloride of zinc or of magnesium being added last of all, but in time to admit of thorough mixture. The composition is then run into suitable molds or spread upon paper of any thickness, and when cooled stamped out into any desired shape. The composition adheres well to paper or clean wood, if it is previously moistened or warmed, and adheres particularly well if applied, in which latter condition it also adheres readily to glass or metal.

When compounded as above, the composition is rendered suitable for ordinary temperatures, or dry and cool places, and the wafers manufactured therefrom will retain their adhesive qualities for a reasonable length of time, and when they fail to act properly may readily be removed and a new wafer be supplied.

For very damp localities the proportions of the ingredients should be changed to suit the following formula, viz: To eighty parts of saturated or softened glue, as described, add glycerine, five parts; Canada balsam, five parts; oil of cloves, five parts; sirup, five parts; chloride of zinc or of magnesium, in small proportion. In this case the ingredients should be thoroughly mixed, but boiled as little as possible, and the quantity of chloride of zinc or of magnesium which is added should be very small.

The molds should be kept free from oil, likewise the manufactured wafers.

While it is essential to use the ingredients mentioned, or their known chemical equivalents, in the manufacture of the improved wafer, yet it is evident that without departing from the spirit of my invention the proportions thereof may be varied, as indicated in the foregoing description, as well as be further varied within the limits of the formula given to adapt the adhesive wafer to the temperature of any particular locality, and cause it to preserve its adhesive properties for a reasonable period of time.

I claim—

The herein-described adhesive wafer or compound, consisting of saturated glue, glycerine, Canada balsam, oil of cloves, sirup, and chloride of zinc or of magnesium, in the proportions substantially as specified.

In testimony whereof I have signed my name to this specification in the presence of two subscribing witnesses.

ALFRED SPITZLI.

Witnesses:
 JOHN CLOTWORTHY,
 WILLIAM R. LYON.